United States Patent
Georgiev et al.

(10) Patent No.: US 7,567,263 B2
(45) Date of Patent: *Jul. 28, 2009

(54) BRUSH FOR WARPING AND WATER REFLECTION EFFECTS

(75) Inventors: Todor T. Georgiev, Campbell, CA (US); John W. Worthington, Minnetonka, MN (US)

(73) Assignee: Adobe Systems Incorporated, San Jose, CA (US)

(*) Notice: Subject to any disclaimer, the term of this patent is extended or adjusted under 35 U.S.C. 154(b) by 326 days.

This patent is subject to a terminal disclaimer.

(21) Appl. No.: 11/497,643

(22) Filed: Aug. 1, 2006

(65) Prior Publication Data

US 2006/0268015 A1    Nov. 30, 2006

Related U.S. Application Data (63) Continuation of application No. 10/771,133, filed on Feb. 2, 2004, now Pat. No. 7,098,932, which is a continuation of application No. 09/715,750, filed on Nov. 16, 2000, now Pat. No. 6,765,589.

(51) Int. Cl.
*G09G 5/00* (2006.01)
*G06T 1/00* (2006.01)
*G06T 15/70* (2006.01)

(52) U.S. Cl. .................. 345/647; 345/644; 345/473; 345/156; 715/700

(58) Field of Classification Search ......... 345/646–648, 345/441–443, 473–475, 586, 156–162, 522, 345/643; 715/700, 706, 708
See application file for complete search history.

(56) References Cited

U.S. PATENT DOCUMENTS

| | | | |
|---|---|---|---|
| 4,616,336 A | 10/1986 | Robertson et al. | |
| 4,723,209 A | 2/1988 | Hernandez et al. | |
| 4,908,874 A | 3/1990 | Gabriel | |
| 5,031,121 A | 7/1991 | Iwai et al. | |
| 5,067,019 A | 11/1991 | Juday et al. | |
| 5,164,899 A | 11/1992 | Sobotka et al. | |
| 5,175,808 A | 12/1992 | Sayre | |
| 5,182,548 A | 1/1993 | Haeberli | |
| 5,208,872 A | 5/1993 | Fisher | |
| 5,214,755 A | 5/1993 | Mason | |

(Continued)

OTHER PUBLICATIONS

Karl Sims, "Choreographed Image Flow," 1992, The Journal of Visualization and Computer Animation, vol. 3, pp. 31-43.

McClelland, D. "Paint with Vectors in Illustrator 8", 1999, Macworld,, vol. 16, No. 3, p. 97.

*Primary Examiner*—Wesner Sajous
(74) *Attorney, Agent, or Firm*—Fish & Richardson P.C.

(57) ABSTRACT

A system for generating a warping effect in an image having a plurality of regions, each associated with a distortion vector. The system includes a programmable processor; and a computer-readable medium including a computer program product comprising instructions operable to cause the programmable processor to receive a source image; receive a user input specifying a movement; modify one or more distortion vectors of the distortion vector field; and modify the source image. The system also includes defining a path segment vector in response to user movement of a brush cursor; modifying one or more distortion vectors having originations covered by the cursor based on the path segment vector; and repeating defining and modifying to produce a warping effect.

19 Claims, 8 Drawing Sheets

U.S. PATENT DOCUMENTS

| | | | |
|---|---|---|---|
| 5,323,312 A | 6/1994 | Saito et al. | |
| 5,347,620 A | 9/1994 | Zimmer | |
| 5,379,373 A | 1/1995 | Hayashi et al. | |
| 5,467,448 A | 11/1995 | Hilton et al. | |
| 5,533,084 A | 7/1996 | Mazers | |
| 5,611,000 A | 3/1997 | Szeliski et al. | |
| 5,611,033 A | 3/1997 | Pitteloud et al. | |
| 5,611,036 A | 3/1997 | Berend et al. | |
| 5,633,996 A | 5/1997 | Hayashi et al. | |
| 5,731,819 A | 3/1998 | Gagne et al. | |
| 5,742,837 A | 4/1998 | Fukui et al. | |
| 5,764,807 A | 6/1998 | Pearlman et al. | |
| 5,796,400 A | 8/1998 | Atkinson et al. | |
| 5,819,300 A | 10/1998 | Kohno et al. | |
| 5,845,303 A | 12/1998 | Templeman | |
| 5,852,683 A | 12/1998 | Jewel | |
| 5,854,634 A * | 12/1998 | Kroitor | 345/473 |
| 5,873,106 A | 2/1999 | Joshy | |
| 5,893,127 A | 4/1999 | Tyan et al. | |
| 5,923,329 A | 7/1999 | Beale | |
| 5,926,188 A | 7/1999 | Kawamoto et al. | |
| 5,978,819 A | 11/1999 | Berstis | |
| 6,009,212 A | 12/1999 | Miller et al. | |
| 6,014,147 A | 1/2000 | Politis et al. | |
| 6,020,897 A | 2/2000 | Carlsen et al. | |
| 6,028,584 A | 2/2000 | Chiang et al. | |
| 6,067,094 A * | 5/2000 | Schuster | 345/441 |
| 6,072,501 A | 6/2000 | Bier | |
| 6,084,595 A | 7/2000 | Bach et al. | |
| 6,088,708 A | 7/2000 | Burch et al. | |
| 6,111,588 A | 8/2000 | Newell | |
| 6,137,488 A | 10/2000 | Kraft et al. | |
| 6,157,747 A | 12/2000 | Szeliski et al. | |
| 6,157,750 A | 12/2000 | Choi et al. | |
| 6,198,489 B1 * | 3/2001 | Salesin et al. | 715/784 |
| 6,201,549 B1 * | 3/2001 | Bronskill | 345/441 |
| 6,204,860 B1 | 3/2001 | Singh | |
| 6,208,360 B1 | 3/2001 | Doi et al. | |
| 6,215,915 B1 | 4/2001 | Reyzin | |
| 6,252,608 B1 | 6/2001 | Snyder et al. | |
| 6,266,684 B1 | 7/2001 | Kraus et al. | |
| 6,288,719 B1 | 9/2001 | Squilla et al. | |
| 6,324,555 B1 | 11/2001 | Sites | |
| 6,326,970 B1 | 12/2001 | Mott et al. | |
| 6,330,072 B1 | 12/2001 | Barada et al. | |
| 6,373,490 B1 | 4/2002 | Bendiksen et al. | |
| 6,373,492 B1 * | 4/2002 | Kroitor | 345/473 |
| 6,377,712 B1 * | 4/2002 | Georgiev et al. | 382/293 |
| 6,384,835 B1 | 5/2002 | Reiter et al. | |
| 6,389,154 B1 | 5/2002 | Stam | |
| 6,389,179 B1 | 5/2002 | Katayama et al. | |
| 6,448,964 B1 | 9/2002 | Isaacs et al. | |
| 6,459,439 B1 | 10/2002 | Ahlquist et al. | |
| 6,486,908 B1 | 11/2002 | Chen et al. | |
| 6,525,735 B1 | 2/2003 | Maillot | |
| 6,542,629 B1 | 4/2003 | Wu et al. | |
| 6,573,889 B1 * | 6/2003 | Georgiev | 345/419 |
| 6,577,777 B1 | 6/2003 | Yoshino et al. | |
| 6,583,800 B1 | 6/2003 | Ridgley et al. | |
| 6,596,032 B2 | 7/2003 | Nojima et al. | |
| 6,606,105 B1 | 8/2003 | Quartetti | |
| 6,608,631 B1 | 8/2003 | Milliron | |
| 6,620,206 B1 | 9/2003 | Seaman et al. | |
| 6,626,958 B1 | 9/2003 | McCauley et al. | |
| 6,628,295 B2 | 9/2003 | Wilensky | |
| 6,636,648 B2 | 10/2003 | Loui et al. | |
| 6,636,849 B1 | 10/2003 | Tang et al. | |
| 6,643,652 B2 | 11/2003 | Helgeson et al. | |
| 6,654,734 B1 | 11/2003 | Mani et al. | |
| 6,687,876 B1 | 2/2004 | Schilit et al. | |
| 6,734,851 B2 * | 5/2004 | Georgiev | 345/419 |
| 6,765,585 B2 * | 7/2004 | Wada | 345/589 |
| 6,765,589 B1 * | 7/2004 | Georgiev et al. | 345/646 |
| 6,766,362 B1 | 7/2004 | Miyasaka et al. | |
| 6,791,574 B2 | 9/2004 | Hoch et al. | |
| 6,813,746 B1 | 11/2004 | O'Shea | |
| 6,826,727 B1 | 11/2004 | Mohr et al. | |
| 6,867,770 B2 | 3/2005 | Payne | |
| 6,877,135 B1 | 4/2005 | Kamiwada et al. | |
| 6,915,484 B1 | 7/2005 | Ayers et al. | |
| 6,963,350 B1 | 11/2005 | Perani et al. | |
| 7,028,255 B1 | 4/2006 | Ayers | |
| 7,098,932 B2 * | 8/2006 | Georgiev et al. | 345/647 |
| 7,312,805 B1 * | 12/2007 | Worthington | 345/647 |
| 7,411,595 B2 * | 8/2008 | Georgiev | 345/644 |
| 2001/0019355 A1 | 9/2001 | Koyanagi et al. | |
| 2002/0004805 A1 | 1/2002 | Nojima et al. | |
| 2002/0021308 A1 | 2/2002 | White et al. | |
| 2002/0085003 A1 | 7/2002 | Nagashima | |
| 2002/0089500 A1 * | 7/2002 | Jennings et al. | 345/420 |
| 2002/0114536 A1 | 8/2002 | Xiong et al. | |
| 2002/0130908 A1 * | 9/2002 | Wilensky | 345/863 |
| 2003/0007204 A1 | 1/2003 | Ashizaki et al. | |
| 2003/0098872 A1 * | 5/2003 | Georgiev | 345/647 |
| 2003/0135520 A1 | 7/2003 | Mitchell et al. | |
| 2003/0158897 A1 | 8/2003 | Ben-Natan et al. | |
| 2003/0169926 A1 | 9/2003 | Sonmez et al. | |
| 2003/0227487 A1 | 12/2003 | Hugh | |
| 2004/0056871 A1 * | 3/2004 | Milliron | 345/647 |
| 2004/0085443 A1 * | 5/2004 | Kallioniemi et al. | 348/135 |
| 2004/0156556 A1 | 8/2004 | Lopez | |
| 2004/0165788 A1 * | 8/2004 | Perez et al. | 382/284 |
| 2005/0005236 A1 | 1/2005 | Brown et al. | |
| 2005/0138572 A1 | 6/2005 | Good et al. | |
| 2005/0188303 A1 | 8/2005 | Ayers et al. | |
| 2005/0223320 A1 | 10/2005 | Brintzenhofe et al. | |
| 2007/0176947 A1 | 8/2007 | Kenyon | |

\* cited by examiner

FIG. 7

BRUSH FOR WARPING AND WATER REFLECTION EFFECTS

CROSS-REFERENCE TO RELATED APPLICATIONS

This application is a continuation application Ser. No. 09/715,750 of, and claims priority to, U.S. Pat. No. 6,765,589, entitled Brush for Warping and Water Reflection Effects, to inventors Todor G. Georgiev and John W. Worthington, which was filed on Nov. 16, 2000, and to U.S. patent application Ser. No. 10/771,133, entitled Brush for Warping and Water Reflection Effects, to inventors Todor G. Georgiev and John W. Worthington, which was filed on Feb. 2, 2004. The disclosures of U.S. Pat. No. 6,765,589 and U.S. patent application Ser. No. 10/771,133 are incorporated herein by reference in its entirety.

BACKGROUND

The present invention relates to computer-implemented methods for brush-based warping including causing reflection effects in an image.

Computer painting programs allow the user to manipulate an electronic image with an onscreen "brush" controlled by an input device such as a mouse. One such program is Goo, available from MetaTools, Inc., 6303 Carpinteria Ave., Carpinteria, Calif., 93013.

The user may typically select from among a variety of brush shapes, e.g., circle, square, or single pixel. The user drags the brush along a "trajectory" from one location to another within the image, thereby defining an "envelope." Pixels within the envelope are affected by the operation of the brush.

One type of brush allows a user to "paint" colors and textures into the envelope. The paintbrush replaces the pixels in the envelope with the image of the brush.

Another type of brush allows the user to "move" portions of the image within the envelope, creating a warping effect. For example, a "sticky" brush moves pixels from the starting point of the envelope to its end. A "slipping" brush moves the pixels from the starting point a distance less than, but proportional to, the length of the trajectory. Other warping brush effects are bloat, pucker, and twirl.

SUMMARY OF THE INVENTION

In general, in one aspect, the invention features a system that includes a programmable processor; and a computer-readable medium, the medium including a computer program product having instructions operable to cause the programmable processor to receive a source image, the source image being associated with a distortion vector field having a plurality of distortion vectors, each distortion vector ending at a source mesh point associated with one or more pixels in the source image; receive a user input specifying a movement in a graphical user interface of a brush cursor over the source image; modify one or more distortion vectors of the distortion vector field according to the movement of the brush cursor over the source image; and modify the source image using the modified distortion vector field to produce a destination image having a warping effect, such that the distortion vectors in the modified distortion vector field map each source mesh point to a corresponding destination mesh point associated with one or more pixels in the destination image.

Particular implementations can include one or more of the following features.

The computer program product includes instructions operable to cause the programmable processor to repeat the modification of the distortion vector field and the modification of the source image in response to receiving additional user input specifying additional movement of the brush cursor.

The direction and the movement of the brush cursor are sampled at regular intervals.

The direction and the movement of the brush cursor are sampled at $\frac{1}{30}$ second intervals.

Each distortion vector modified is modified by a magnitude determined by a corresponding speed of the movement of the brush cursor.

The brush cursor has associated brush pressure values that determine a strength of the brush cursor at each region of the source image covered by the brush cursor and the instructions to modify one or more distortion vectors of the distortion vector field are operable to cause the programmable processor to modify each distortion vector by a magnitude determined by the strength of the brush cursor for the region.

The brush cursor has uniform brush pressure.

The brush cursor has non-uniform brush pressure.

In some aspects, the invention features a system including a programmable processor; and a computer-readable medium, the medium including a computer program product for generating a warping effect in an image having a plurality of regions, each region being associated with a distortion vector that begins at a destination mesh point in a destination mesh and ends at a source point in a distortion mesh. The computer program product includes instructions operable to cause the programmable processor to: define a path segment vector in response to user movement of a brush cursor; modify one or more distortion vectors originating in regions covered by the cursor based on the path segment vector; repeat the instructions to define and modify to produce a warping effect; and sample a source image using the distortion vectors to produce a destination image. The instructions to modify one or more distortion vectors originating in regions covered by the cursor based on the path segment vector include instructions operable to cause the programmable processor to: multiply the path segment vector by a predetermined matrix, thereby producing a product vector; interpolate each distortion vector between mesh points that surround the end of the product vector, thereby producing an interpolated vector; and combine the product vector and the interpolated vector.

Particular implementations can include one or more of the following features.

The direction of the path segment vector is opposite to the direction of movement of the brush cursor.

The instructions operable to cause the programmable processor to multiply cause the magnitude of the product vector to be substantially twice the magnitude of the path segment vector.

The instructions operable to cause the programmable processor to multiply cause the direction of the product vector to differ from the direction of the path segment vector by substantially 90 degrees.

The interpolation for the distortion vector is linear, bilinear, or of higher order.

The instructions operable to cause the programmable processor to define include instructions operable to cause the programmable processor to define a plurality of path segment vectors in response to user manipulation of a brush cursor, wherein the magnitude of each path segment vector depends on its location within the brush cursor. The instructions operable to cause the programmable processor to modify one or more distortion vectors include instructions operable to cause the programmable processor to modify a distortion vector using the nearest path segment vector.

In some aspects, the invention features a system including a programmable processor; and a computer-readable medium, the medium including a computer program product for generating a warping effect in an image having a plurality of regions, each region being associated with a distortion vector. The computer program product includes instructions operable to cause the programmable processor to: divide the image into a frozen area and an unfrozen area by a boundary in response to user input; move a brush cursor from the frozen area into the unfrozen area in response to user input; define a path segment vector in response to user movement of the brush cursor; modify the distortion vectors in a region of the unfrozen area that is covered by the cursor to produce a reflection effect based on a portion of the frozen area, the distortion vectors being modified based on the path segment vector; and repeat the instructions to define and modify to produce a warping effect.

Particular implementations can include one or more of the following features.

Each distortion vector ends at a mesh point in a distortion mesh, and the instructions operable to cause the programmable processor to modify distortion vectors include instructions operable to cause the programmable processor to: multiply the path segment vector by a predetermined matrix, thereby producing a product vector; interpolate each distortion vector between mesh points that surround the end of the product vector, thereby producing an interpolated vector; and combine the product vector and the interpolated vector.

In some aspects, the invention features a system including a programmable processor; and a computer-readable medium including a computer program product for generating a warping effect in an image having a plurality of regions, each region being associated with a distortion vector, wherein the distortion vectors form a distortion vector field. The computer program product includes instructions operable to cause the programmable processor to: generate one or more further distortion vector fields; modify each distortion vector field using a different time-varying function; combine the resulting distortion vector fields to produce a time-varying distortion vector field; and repeatedly sample the source image using the time-varying distortion vector field to produce an image having an animated image.

Particular implementations can include one or more of the following features.

A sum of the time-varying functions is one at any given time.

Each of the time-varying functions is continuous.

Advantages that can be seen in implementations of the invention include one or more of the following. A mirror brush is provided that creates a reflection effect in an image. The reflection effect is warped to look like a reflection on a water surface with waves. The warped reflection effect can also be animated with very little processing expense to produce an animated water reflection effect. An artist can move the brush to produce different types of waves. To the artist, effect feels like "painting the waves" on which the image is reflected.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
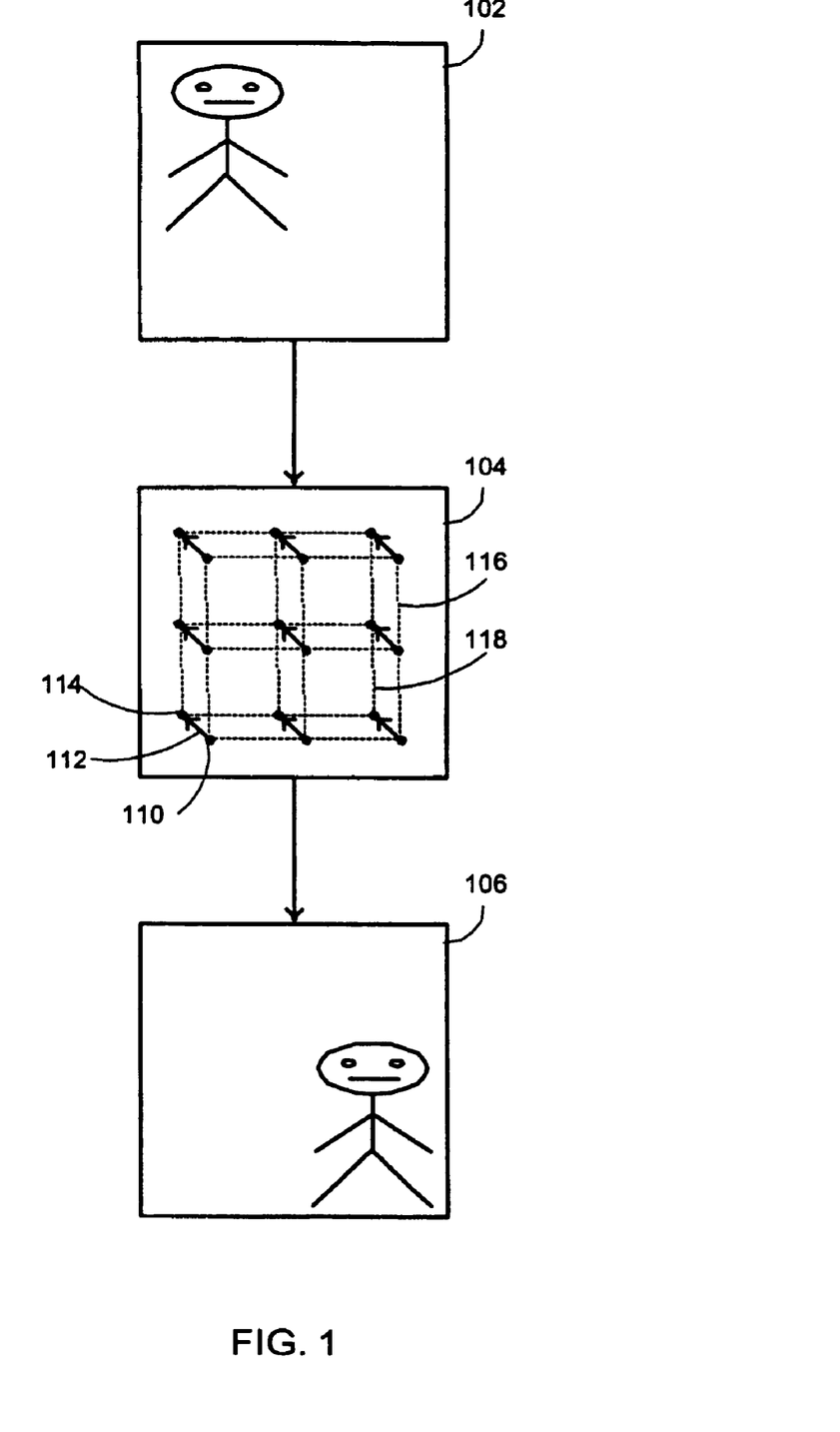
FIG. 1 graphically depicts a process for generating a destination image.

FIG. 1 graphically depicts a process for generating a destination image. A destination image 106 is associated with a distortion vector field 104. The vector field 104 includes a plurality of distortion vectors 112. Each distortion vector 112 begins at a destination mesh point 110 and ends at a source mesh point 114.

Each destination mesh point 110 is associated with a region in the destination image. The destination mesh points 110 collectively form a destination mesh 116. Each source mesh point 114 is associated with a region in the source image. The source mesh points 114 collectively form a distortion mesh 118. The distortion vector field 104 is used to sample from regions in the source image to generate regions in destination image 106. Each region in the source and destination image contains one or more pixels.

In one implementation, sampling includes simply copying the pixels from regions in the source image to regions in the destination image according to the distortion vectors. In another implementation, sampling includes applying a predetermined weight function to the pixels copied. In FIG. 1, each vector 110 points toward the upper left of its mesh point. Therefore, the objects in the source image appear to have moved toward the lower right in the destination image.

In one implementation the mesh is repeatedly updated as the brush moves over the image. This implementation is now described in detail.

Figure 2:
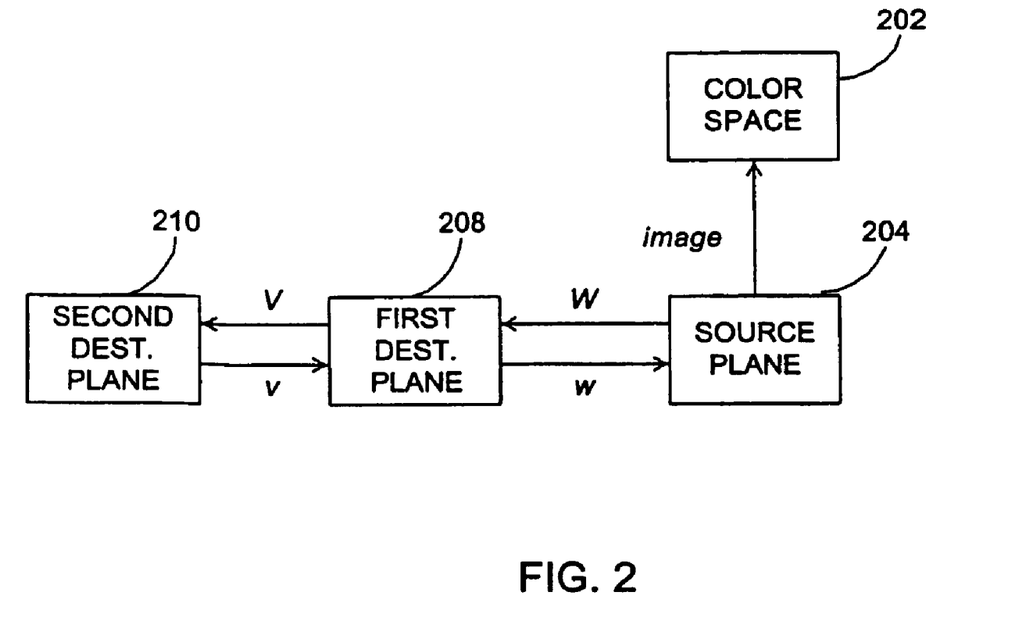
FIG. 2 depicts a process for producing a destination image by sampling or simply mapping from a source image plane to a color space.

Referring to FIG. 2, a destination image is produced by sampling or simply mapping from the source image plane 204 to a color space 202. While this implementation is described in terms of image planes, the image can be defined on any sort of surface, such as a sphere, cylinder, and the like. When a user first applies a warping brush to the source image, he intends to create a deformation W of the source plane to a first destination plane 208, where W is a set of distortion vectors describing the forward mapping. The system implements the warping as an inverse mapping w from the first destination plane to the source plane. When the user applies the warping brush a second time, the user intends a mapping V from the first destination plane to a second destination plane 210. The system implements the warping as an inverse mapping v. Further applications of the warping brush are handled in a similar manner, using further destination planes and inverse mappings. Mappings w and v can be implemented as distortion meshes, as described above.

Inverse mapping w is represented as a vector w=(p,q) at each point (x,y) of the first destination plane, where p and q are the horizontal and vertical components of w, respectively. Then w is represented as:

$$w=(p(x,y),q(x,y))$$

Inverse mapping v is represented as a "path segment vector" $v=(v_x, v_y)$ at each point (x,y) of the second destination plane, where $v_x$ and $v_y$ are the horizontal and vertical components of v, respectively. The direction of the path segment vector is opposite to the direction of movement of the brush cursor.

Figure 3:
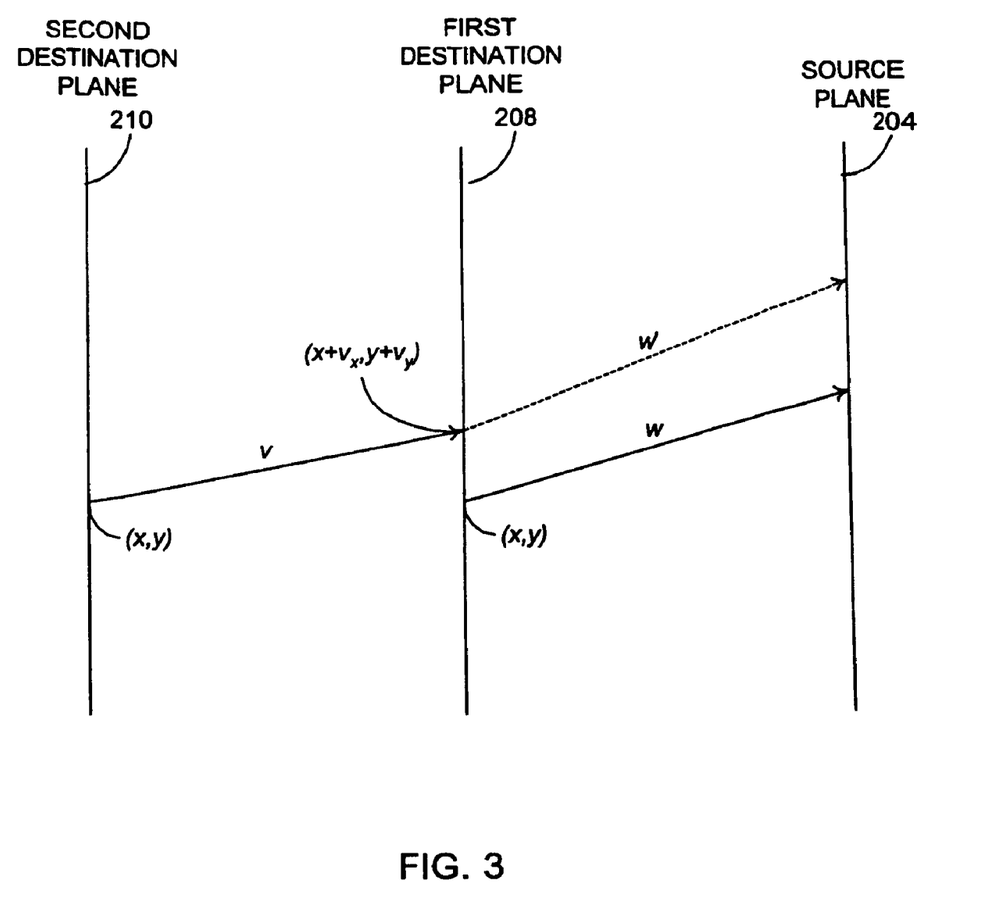
FIG. 3 presents a side view of the source plane and destination planes.

The system concatenates mappings v and w in the following manner. FIG. 3 presents a side view, sighted along the x-axis, of the source plane and destination planes. Vector v maps from a point (x,y) in the second destination plane to a point $(x+v_x, y+v_y)$ in the first destination plane. Vector w maps from a point (x,y) in the first destination plane to a point (x+p, y+q) in the source plane. The coordinate (x,y) is the location of a mesh point. FIG. 3 depicts the general case where vector v does not end at a mesh point.

Because vector v does not end at the mesh point where w is defined, the system interpolates to generate a vector w' that originates from the point $(x+v_x, y+v_y)$ between the mesh points in the first destination plane and describes the distortion at that point. The interpolation for the distortion vector can be linear, bilinear, or of higher order.

In general, the vector w' is approximated by a Taylor series expansion in two variables (x,y).

$$w' = w(x + v_x, x + v_y) \quad (1)$$

$$= w(x, y) + \frac{\partial w(x, y)}{\partial x}v_x + \frac{\partial w(x, y)}{\partial y}v_y + \frac{\partial^2 w}{\partial x \partial y}v_x v_y +$$

$$\frac{\partial^2 w}{\partial x^2}\frac{v_x^2}{2} + \frac{\partial^2 w}{\partial y^2}\frac{v_y^2}{2} + \frac{\partial^3 w}{\partial x^3}\frac{v_x^3}{6} + \frac{\partial^3 w}{\partial x^2 \partial y}\frac{v_x^2 v_y}{2} +$$

$$\frac{\partial^3 w}{\partial x \partial y^2}\frac{v_x v_y^2}{2} + \frac{\partial^3 w}{\partial y^3}\frac{v_y^3}{6} + \dots$$

In one embodiment, the mesh points form squares, and so the mesh points are separated horizontally by a, and vertically by a. In other implementations, the mesh points can form rectangles, or can be arranged in more complex way. The Taylor series can be approximated up to the first order as $$w' = w + \frac{w(x+a, y) - w(x, y)}{a}v_x + \frac{w(x, y+a) - w(x, y)}{a}v_y \quad (2)$$

Then the total distortion (p', q') is given by $$p' = v_x + p + \frac{p(x+a, y) - p}{a}v_x + \frac{p(x, y+a) - p}{a}v_y \quad (3)$$

$$q' = v_y + q + \frac{q(x+a, y) - q}{a}v_x + \frac{q(x, y+a) - q}{a}v_y \quad (4)$$

A better quality can be achieved at the expense of speed if more than linear in v terms are used (in the above Taylor expansion). For example by adding the next term in (1), $$\frac{\partial^2 w}{\partial x \partial y}v_x v_y$$

we get bilinear interpolation. By adding further terms in the Taylor series, we get higher order interpolations.

The corresponding expressions involve more than two mesh points because of the higher derivatives, and are apparent to those skilled in the art. Also, other interpolation methods can be used and there is a wealth of literature on the subject. See for example G. Wolberg, "Digital Image Warping", chapter 5, for an approach focused on antialiasing.

As the user moves the brush, the movement of the brush is regularly sampled. For example, the movement can be sampled every $\frac{1}{30}^{th}$ of a second. As each sample is taken, a path segment vector is generated. For example, a vector w is generated during the first sample, and a vector v is defined during a second sample. The system then concatenates vectors v and w, as described above to produce a new vector w, which will be concatenated with a vector generated during the next sample. The process repeats in this manner for each sample.

Each brush stroke comprises a plurality of tiny brush movements, each referred to as a "sample." For each sample, a plurality of path segment vectors (referred to as a "path segment vector field") is generated. The path segment vector field is used to modify the distortion vector field. This process is repeated for each sample to produce a continuous effect.

The process of generating a path segment vector field for a sample is now described according to one implementation. A path segment vector is generated at each mesh point under the brush cursor. The direction of a path segment vector is opposite to the direction of movement of the brush cursor during the sample associated with that path segment vector.

The brush can have a brush pressure that is constant or varying. Brush pressure describes the way in which the strength of an effect induced by a brush varies within the area affected by the brush. A brush having an effect of constant strength is said to have constant brush pressure. A brush having an effect of varying strength is said to have varying brush pressure. One example of a brush having varying brush pressure is a warping brush. One type of warping brush induces a stronger brush effect near its center and a weaker effect near its edges. Brush pressure can be implemented by basing the magnitude of the path segment vectors on their location within the brush cursor.

As described above, a slipping brush "moves the pixels" from its starting point a distance less than, but proportional to, the length of its envelope. A slipping brush having a warping effect could move pixels near the center of the envelope further than pixels near the edge of the envelope. This is so because the vectors v are multiplied by the brush pressure, which is different at different points in the cursor. For example, the brush pressure can be 1 at the center of the brush, and smoothly go down to zero at the edges of the brush.

The system limits the effect of each brush sample stroke. In one implementation, the effect of each stroke is limited to the size of a mesh tile. A mesh tile is the area between four adjacent mesh points. Consequently, the increments added to w at each brush stroke are limited in size. The x- and y-components of vector w are kept smaller than a. After repeated brushing over one area, the distortion in that area reaches a state of stability, as described below. From the user's point of view we get a smear which looks like a small area that gets stretched and greatly magnified in the direction of brushing. In terms of inverse mappings, the reason for this is that all of the distortion vectors in a line along the direction of brushing are sampling from the same pixel. Next this effect is described in more detail.

In a matrix representation equations (3) and (4) become $$\begin{pmatrix} p \\ q \end{pmatrix}_{new} = \begin{pmatrix} p \\ q \end{pmatrix}_{old} + \begin{pmatrix} 1 + \frac{p(x+a,y)-p}{a} & \frac{p(x,y+a)-p}{a} \\ \frac{q(x+a,y)-q}{a} & 1 + \frac{q(x,y+a)-q}{a} \end{pmatrix} \begin{pmatrix} v_x \\ v_y \end{pmatrix} \quad (5)$$

We define a new coordinate system x',y' such that the x' axis is opposite in direction to the direction of the brush stroke and the y' axis is perpendicular to the brush stroke in the plane of the image. Now q'=0 and $v_{y'}$=0. Then equation (5) becomes (omitting the prime (') notation everywhere)

$$\begin{pmatrix} p \\ 0 \end{pmatrix}_{new} = \begin{pmatrix} p \\ 0 \end{pmatrix}_{old} + \begin{pmatrix} 1 + \frac{p(x+a,y)-p}{a} & \frac{p(x,y+a)-p}{a} \\ 0 & 1 \end{pmatrix} \begin{pmatrix} v_x \\ 0 \end{pmatrix} \quad (6)$$

Because the brushing is opposite to x, $v_x$>0, each brush stroke sample adds a little to p. Assuming an initial state of w(x+a,y)=0, equation (6) becomes $$p_{new} = p + \left(1 - \frac{p}{a}\right)v_x \quad (7)$$

Let $dp = p_{new} - p$ and $dv = v_x$. The system accumulates small distortions dp into a total distortion p $$dp = \left(1 - \frac{p}{a}\right)dv \quad (8)$$

Here the sum of all samples of brush movements dv is v and the current p=p(v). Equation (8) has a solution $$p = a\left(1 - e^{-\frac{v}{a}}\right) \quad (9)$$

Figure 4A:
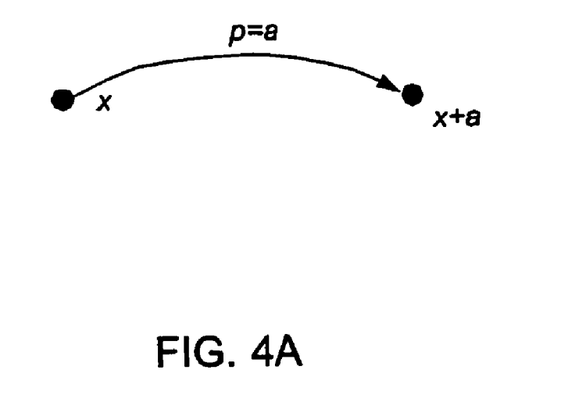
FIG. 4A depicts a distortion in a "state of stability" for 2 mesh points, for a forward warping brush.

From equation (9) we see that, as the user continues brushing at one single mesh point, p approaches the magnitude of the distance a to the next mesh point, but never exceeds a, and a state of stability is thus reached. In a similar manner, it can be shown that p will approach a for any mesh point. Therefore, the difference in distortion between two adjacent mesh points in the state of stability is equal to the distance between the mesh points. We see that p=a in the limit. FIG. 4A depicts this situation. A vector p extending from a mesh point x to a mesh point x+a, thereby implementing the forward warping effect described above.

For this reason, all of the distortion vectors in a line along the direction of brushing sample from the same pixel. This implements a forward warping brush. The forward warping brush includes two variations: a slipping brush and a sticky brush. The sticky brush is described above. The slipping brush is similar to the sticky brush, but each distortion is multiplied by a constant less than 1.

Forward Mirror Brush

One equation for a forward warping brush is given above as equation (5). In one implementation, a modification of the above technique is used to create a mirror reflection brush. The system described above is changed so that in Equation (5) "1" is replaced by "2" to yield:

$$\begin{pmatrix} p \\ q \end{pmatrix}_{new} = \begin{pmatrix} p \\ q \end{pmatrix}_{old} + \begin{pmatrix} 2 + \frac{p(x+a,y)-p}{a} & \frac{p(x,y+a)-p}{a} \\ \frac{q(x+a,y)-q}{a} & 2 + \frac{q(x,y+a)-q}{a} \end{pmatrix} \begin{pmatrix} v_x \\ v_y \end{pmatrix} \quad (10)$$

Equation (8) then becomes $$dp = \left(2 - \frac{p}{a}\right)dv \quad (11)$$

Here the sum of all sample vectors dv is v and the current p=p(v). Equation (11) has a solution $$p = a\left(2 - e^{-\frac{v}{a}}\right) \quad (12)$$

From equation (12) we see that, as the user continues brushing at one single mesh point, p approaches the magnitude of twice the distance a to the next mesh point, but never exceeds 2a, and a state of stability is thus reached. In a similar manner, it can be shown that the difference between the magnitudes of adjacent vectors having same direction will approach 2a.

Figure 4B:
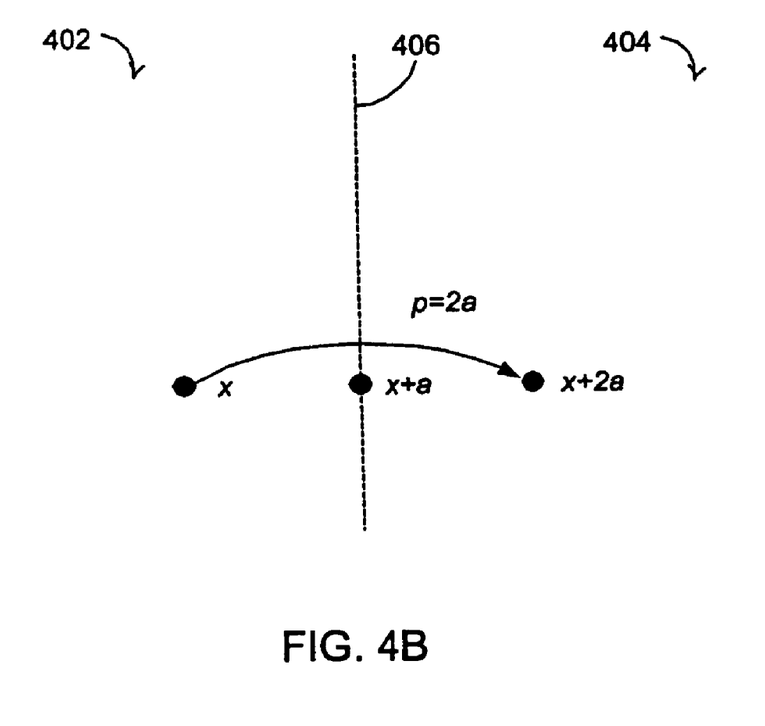
FIG. 4B depicts a distortion in a "state of stability" for 3 mesh points, for a mirror brush.
Figure 4C:
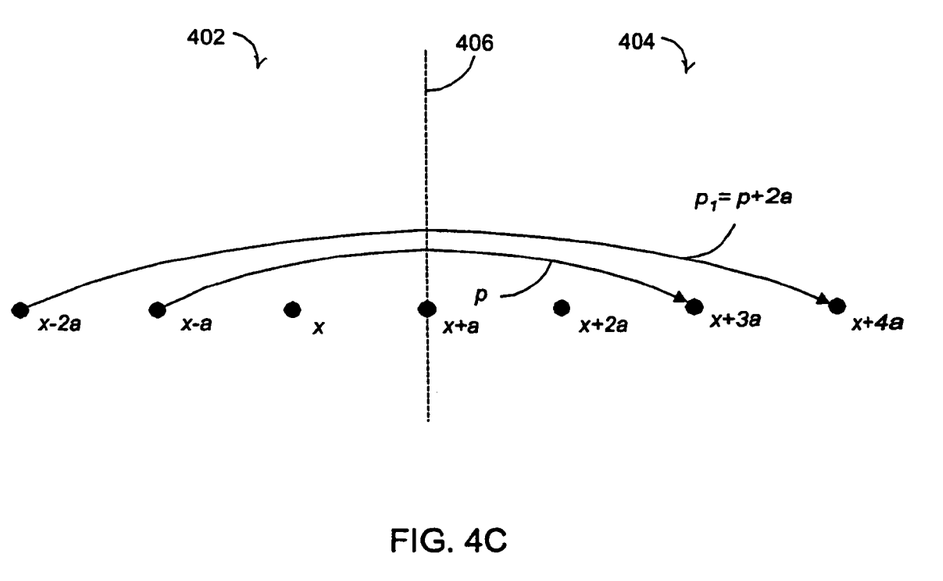
FIG. 4C depicts a distortion in a "state of stability" for 7 mesh points, for a mirror brush.

FIG. 4B depicts a vector p extending from a mesh point x to a mesh point x+2a, thereby implementing a reflection effect about mesh point x+a. We see that p=2a in the limit. FIG. 4C depicts a vector p beginning from a mesh point x−a and a vectors $p_1$ beginning from an adjacent mesh point x−2a. We see that $p_1$=p+2a, thereby implementing a reflection effect about mesh point x+a.

Other effects can be attained by using other coefficients, A, B, C, D, which need not be integers. Equation (10) can be generalized as shown by:

$$\begin{pmatrix} p \\ q \end{pmatrix}_{new} = \quad (13)$$

$$\begin{pmatrix} p \\ q \end{pmatrix}_{old} + \left( \begin{pmatrix} A & B \\ C & D \end{pmatrix} + \begin{pmatrix} \frac{p(x+a,y)-p}{a} & \frac{p(x,y+a)-p}{a} \\ \frac{q(x+a,y)-q}{a} & \frac{q(x,y+a)-q}{a} \end{pmatrix} \right) \begin{pmatrix} v_x \\ v_y \end{pmatrix}$$

The mirror effect discussed above is attained using $$\begin{pmatrix} A & B \\ C & D \end{pmatrix} = \begin{pmatrix} 2 & 0 \\ 0 & 2 \end{pmatrix} \quad (14)$$

A perfect vertical mirror effect can be attained by eliminating the horizontal components, for example $$\begin{pmatrix} A & B \\ C & D \end{pmatrix} = \begin{pmatrix} 0 & 0 \\ 0 & 2 \end{pmatrix} \quad (15)$$

Just stretching of the image by a certain amount can be achieved by equation (14) where "2" is replaced by a number less than 1.

To achieve a more clearly defined reflection effect, in one implementation for each sample we execute the above calculation two or more times. This produces faster and better-defined saturation and stabilization into the mirror state.

Other warping effects are achieved by selecting other values for A, B, C and D.

Figure 5:
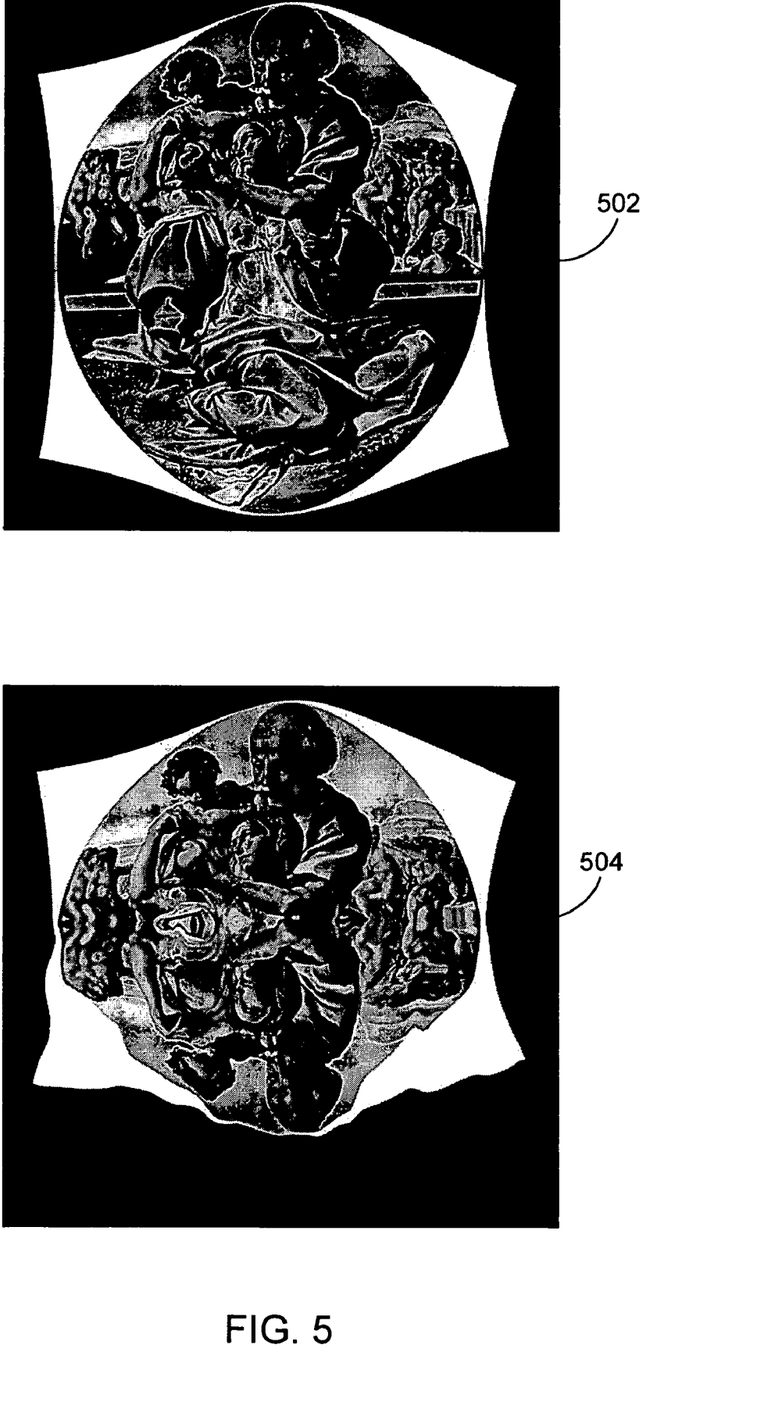
FIG. 5 presents an image resulting from the use of the warping mirror brush on an image.

FIG. 5 presents an image 504 resulting from the use of the warping mirror brush on an image 502. A user has designated the upper portion of image 502 as a frozen area and the lower portion of the image as an unfrozen area, and has used the warping mirror brush to create a warped reflection of the frozen area into the unfrozen area. As is apparent in image 504, the warping mirror brush can be used advantageously to create waves, producing a water reflection effect. If desired, a user can use a smoothing brush to remove the waves. For example, the smoothing brush can provide a simple blur of the mesh.

In one implementation a straight-line boundary is established, dividing the image into a frozen region and an unfrozen region. Distortion vectors in the frozen area are undisturbed by the reflection process, while mesh points vectors in the unfrozen area may be modified by the process. Brushing from the frozen area to the unfrozen area produces an interesting water reflection effect. Brushing perpendicular to the boundary produces a mirror-like effect, while brushing at an angle to the boundary produces a different artistic effect. The boundary to the frozen area is used as a starting point for the above process of modifying the distortion mesh.

Left Mirror Brush

The process of modifying a distortion vector for a sample for a "left mirror brush" is now described. A path segment vector is generated at each mesh point under the brush cursor. The coefficients of the matrix in equation (14) are chosen to rotate the path segment vector by 90 degrees. Each resulting product vector has a direction perpendicular to the direction of movement of the brush, and to the right of the movement of the brush. The length of the vector is determined by the displacement of the brush since the last sample. This brush "displaces pixels" to the left of the brush to produce an interesting effect.

Using this brush with the above mirroring engine produces a reflection perpendicular to the movement of the brush and to the left of the direction of brush movement. This brush is useful because there is no need to define frozen and unfrozen regions, and the reflection effect can be produced by consecutive, parallel, overlapping brush strokes.

Figure 6:
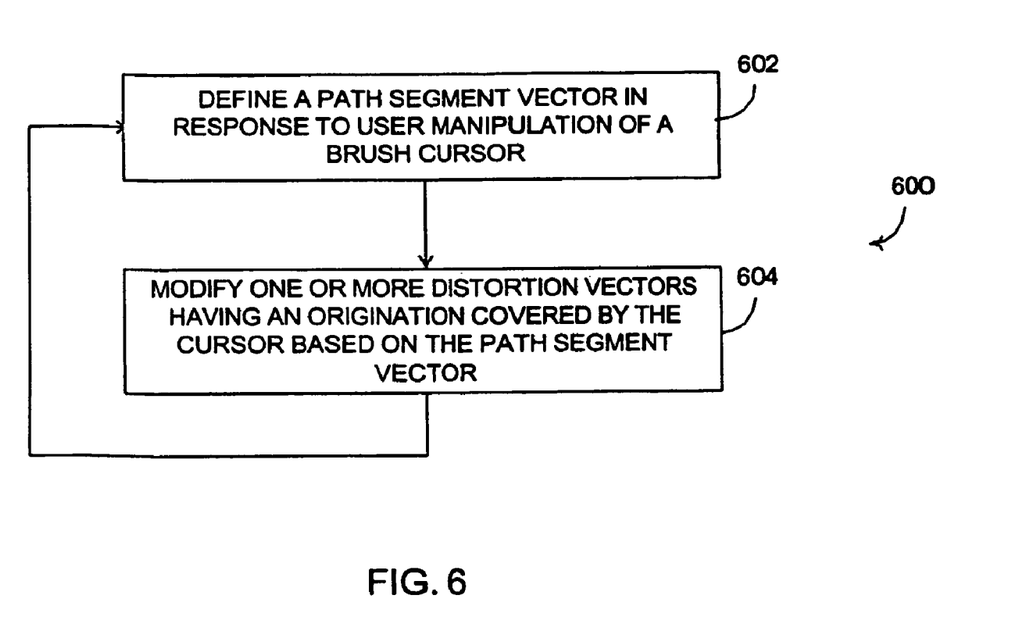
FIG. 6 is a flowchart depicting a process that generates a warping effect.

FIG. 6 is a flowchart depicting a process 600. The process generates a warping effect in an image having a plurality of regions, where each region is associated with a distortion vector. The process defines a path segment vector in response to user manipulation of a brush cursor (step 602). The process then modifies one or more distortion vectors (the vector field) having originations covered by the cursor based on the path segment vector(step 604). As described above, each distortion vector has an origination at a destination mesh point 110. These steps are repeated as the brush moves to produce a warping effect. The above modification process is represented on FIG. 3 and related text.

Figure 7:
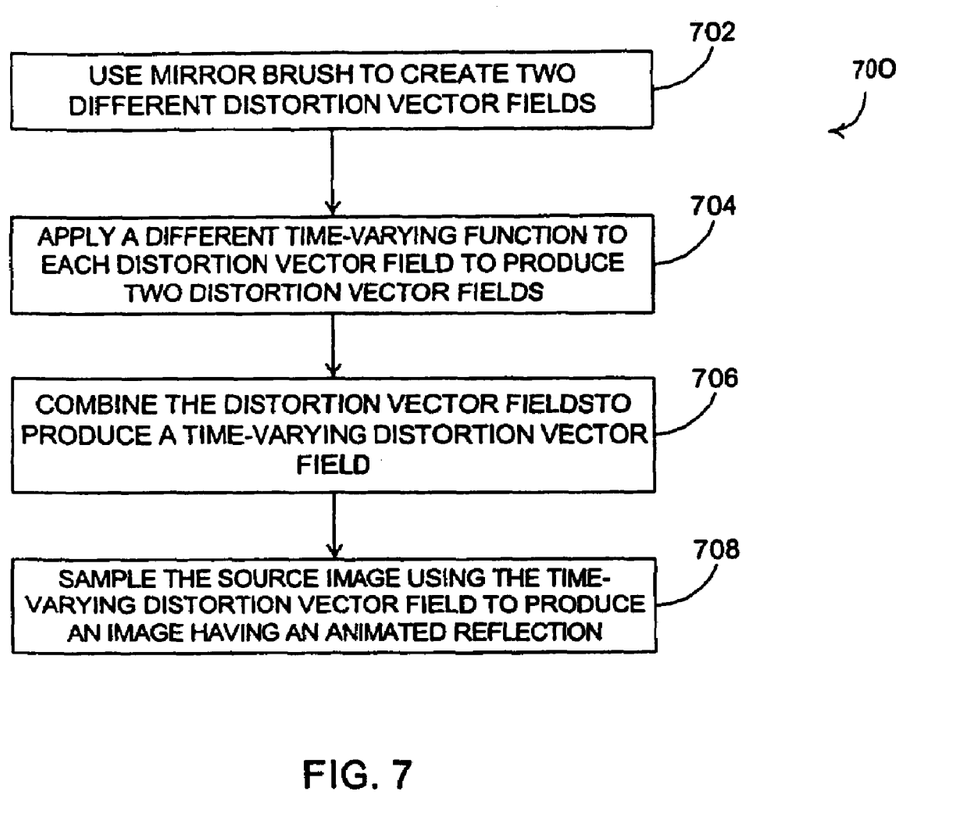
FIG. 7 is a flowchart of a process for creating an animated reflection.

FIG. 7 is a flowchart of a process 700 for creating an animated reflection. A user manipulates a mirror brush to create two different distortion vector fields describing two non-identical reflection effects from the same source image (step 702). Each distortion vector field can be created using process 600, described above.

The process applies a different time-varying function to each distortion vector field to create two distortion vector fields (step 704). For example, a $\sin^2(t)$ function can be multiplied by the magnitudes of the distortion vectors for one distortion vector field, and a $\cos^2(t)$ function can be applied to the magnitudes of the distortion vectors for the other distortion vector field. Of course, other time-varying functions can be used. However, they should sum up to 1, at least approximately.

The process combines the distortion vector fields to create a time-varying distortion vector field (step 706). For example, the vector magnitudes of the time-varying distortion vector fields can be summed for corresponding distortion vectors.

The process samples the source image using the time-varying distortion vector field to create a destination image (step 708). The sampling process is described above.

Process 700 can be varied in many ways. For example, more than two distortion vector fields can be combined to create the time-varying distortion vector field. The coefficients should still sum up to 1, at least approximately. As another example, time-varying distortion vector fields can be combined with non-time-varying distortion vector fields. Each of the above-described variations of process 700 creates an animated reflection effect. When a warping mirror brush is used to create one of the updated meshes, an animated water reflection effect is produced.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results.

What is claimed is:

1. A system comprising:
a programmable processor; and
a computer-readable medium comprising a computer program product comprising instructions operable to cause the programmable processor to:
receive a source image, the source image being associated with a distortion vector field having a plurality of distortion vectors, each distortion vector ending at a source mesh point associated with one or more pixels in the source image;
receive a user input specifying a movement in a graphical user interface of a brush cursor over the source image;
modify one or more distortion vectors of the distortion vector field according to the movement of the brush cursor over the source image; and
modify the source image using the modified distortion vector field to produce a destination image having a warping effect, such that the distortion vectors in the modified distortion vector field map each source mesh point to a corresponding destination mesh point associated with one or more pixels in the destination image.

2. The system of claim 1, further comprising instructions operable to cause the programmable processor to:
repeat the modification of the distortion vector field and the modification of the source image in response to receiving additional user input specifying additional movement of the brush cursor.

3. The system of claim 1, wherein the direction and the movement of the brush cursor are sampled at regular intervals.

4. The system of claim 1, wherein the direction and the movement of the brush cursor are sampled at 1/30 second intervals.

5. The system of claim 1, wherein each distortion vector modified is modified by a magnitude determined by a corresponding speed of the movement of the brush cursor.

6. The system of claim 1, wherein the brush cursor has associated brush pressure values that determine a strength of the brush cursor at each region of the source image covered by the brush cursor and the instructions to modify one or more distortion vectors of the distortion vector field are operable to cause the programmable processor to:
modify each distortion vector by a magnitude determined by the strength of the brush cursor for the region.

7. The system of claim 6, wherein the brush cursor has uniform brush pressure.

8. The system of claim 6, wherein the brush cursor has non-uniform brush pressure.

9. A system comprising:
a programmable processor; and
a computer-readable medium comprising a computer program product for generating a warping effect in an image having a plurality of regions, each region being associated with a distortion vector that begins at a destination mesh point in a destination mesh and ends at a source point in a distortion mesh, the computer program product comprising instructions operable to cause the programmable processor to:
define a path segment vector in response to user movement of a brush cursor;
modify one or more distortion vectors originating in regions covered by the cursor based on the path segment vector, wherein the instructions to modify comprise instructions operable to cause the programmable processor to:
multiply the path segment vector by a predetermined matrix, thereby producing a product vector;
interpolate each distortion vector between mesh points that surround the end of the product vector, thereby producing an interpolated vector; and
combine the product vector and the interpolated vector;
repeat the instructions to define and modify to produce a warping effect; and
sample a source image using the distortion vectors to produce a destination image.

10. The system of claim 9, wherein the direction of the path segment vector is opposite to the direction of movement of the brush cursor.

11. The system of claim 10, wherein the instructions operable to cause the programmable processor to multiply cause the magnitude of the product vector to be substantially twice the magnitude of the path segment vector.

12. The system of claim 10, wherein the instructions operable to cause the programmable processor to multiply cause the direction of the product vector to differ from the direction of the path segment vector by substantially 90 degrees.

13. The system of claim 9, wherein the interpolation for the distortion vector is linear, bilinear, or of higher order.

14. The system of claim 9, wherein:
the instructions operable to cause the programmable processor to define comprise instructions operable to cause the programmable processor to define a plurality of path segment vectors in response to user manipulation of a brush cursor, wherein the magnitude of each path segment vector depends on its location within the brush cursor; and
the instructions operable to cause the programmable processor to modify one or more distortion vectors comprise instructions operable to cause the programmable processor to modify a distortion vector using the nearest path segment vector.

15. A system comprising:
a programmable processor; and
a computer-readable medium comprising a computer program product for generating a warping effect in an image having a plurality of regions, each region being associated with a distortion vector, the computer program product comprising instructions operable to cause the programmable processor to:
divide the image into a frozen area and an unfrozen area by a boundary in response to user input;

move a brush cursor from the frozen area into the unfrozen area in response to user input;

define a path segment vector in response to user movement of the brush cursor;

modify the distortion vectors in a region of the unfrozen area that is covered by the cursor to produce a reflection effect based on a portion of the frozen area, the distortion vectors being modified based on the path segment vector; and repeat the instructions to define and modify to produce a warping effect.

16. The system of claim 15, wherein each distortion vector ends at a mesh point in a distortion mesh, and wherein the instructions operable to cause the programmable processor to modify distortion vectors comprise instructions operable to cause the programmable processor to:

multiply the path segment vector by a predetermined matrix, thereby producing a product vector;

interpolate each distortion vector between mesh points that surround the end of the product vector, thereby producing an interpolated vector; and combine the product vector and the interpolated vector.

17. A system comprising:

a programmable processor; and a computer-readable medium comprising a computer program product for generating a warping effect in an image having a plurality of regions, each region being associated with a distortion vector, wherein the distortion vectors form a distortion vector field, the computer program product comprising instructions operable to cause the programmable processor to:

generate one or more further distortion vector fields;

modify each distortion vector field using a different time-varying function;

combine the resulting distortion vector fields to produce a time-varying distortion vector field; and repeatedly sample the source image using the time-varying distortion vector field to produce an image having an animated image.

18. The system of claim 17, wherein a sum of the time-varying functions is one at any given time.

19. The system of claim 18, wherein each of the time-varying functions is continuous.

* * * * *

UNITED STATES PATENT AND TRADEMARK OFFICE
CERTIFICATE OF CORRECTION

PATENT NO. : 7,567,263 B2
APPLICATION NO. : 11/497643
DATED : July 28, 2009
INVENTOR(S) : Todor G. Georgiev and John W. Worthington It is certified that error appears in the above-identified patent and that said Letters Patent is hereby corrected as shown below:

Title Page:
left column, (75) Inventors, line 1:
delete "Todor T. Georgiev, Campbell",
and replace with --Todor G. Georgiev, Sunnyvale--

Signed and Sealed this

Ninth Day of March, 2010

David J. Kappos
*Director of the United States Patent and Trademark Office*